United States Patent
Ngo et al.

(10) Patent No.: US 10,599,601 B1
(45) Date of Patent: Mar. 24, 2020

(54) SINGLE-WIRE BUS (SUBUS) SLAVE CIRCUIT AND RELATED APPARATUS

(71) Applicant: Qorvo US, Inc., Greensboro, NC (US)

(72) Inventors: Christopher Truong Ngo, Queen Creek, AZ (US); Alexander Wayne Hietala, Phoenix, AZ (US); Puneet Paresh Nipunage, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/407,397

(22) Filed: May 9, 2019

Related U.S. Application Data

(60) Provisional application No. 62/793,336, filed on Jan. 16, 2019.

(51) Int. Cl.
  *G06F 13/38* (2006.01)
  *G06F 13/40* (2006.01)
  *G06F 13/16* (2006.01)

(52) U.S. Cl.
  CPC ...... *G06F 13/4068* (2013.01); *G06F 13/1668* (2013.01)

(58) Field of Classification Search
  CPC combination set(s) only.
  See application file for complete search history.

(56) References Cited

U.S. PATENT DOCUMENTS

| | | | |
|---|---|---|---|
| 3,953,835 A | | 4/1976 | Cuccio et al. |
| 5,684,803 A | * | 11/1997 | Nguyen Thuy ..... G06F 13/3625 370/451 |
| 5,787,132 A | * | 7/1998 | Kishigami ............. H04L 7/042 370/304 |
| 5,832,207 A | * | 11/1998 | Little ..................... G06F 7/588 726/36 |
| 6,408,163 B1 | | 6/2002 | Fik |
| 6,484,268 B2 | | 11/2002 | Tamura et al. |
| 7,685,320 B1 | | 3/2010 | Wishneusky |

(Continued)

OTHER PUBLICATIONS

Non-Final Office Action for U.S. Appl. No. 14/575,491, dated May 26, 2017, 20 pages.

(Continued)

*Primary Examiner* — Cheng Yuan Tseng
(74) *Attorney, Agent, or Firm* — Withrow & Terranova, P.L.L.C.

(57) ABSTRACT

A single-wire bus (SuBUS) slave circuit is provided. The SuBUS slave circuit is coupled to a SuBUS bridge circuit via a SuBUS and can be configured to perform a slave task that may block communication on the SuBUS. Notably, the SuBUS slave circuit may not be equipped with an accurate timing reference source that can determine a precise timing for terminating the slave task and unblock the SuBUS. Instead, the SuBUS slave circuit is configured to terminate the slave task and unblock the SuBUS based on a self-determined slave free-running-oscillator count derived from a start-of-sequence training sequence that precedes any SuBUS telegram of a predefined SuBUS operation, even though the SuBUS operation is totally unrelated to the slave task. As such, it may be possible to eliminate the accurate timing reference source from the SuBUS slave circuit, thus helping to reduce cost and current drain in the SuBUS slave circuit.

22 Claims, 6 Drawing Sheets

(56) References Cited

U.S. PATENT DOCUMENTS

| | | | |
|---|---|---|---|
| 7,729,427 B2* | 6/2010 | Kwok | H04B 3/542 326/30 |
| 8,509,318 B2* | 8/2013 | Tailliet | G06F 13/4295 320/145 |
| 9,430,321 B2 | 8/2016 | Slik | |
| 9,519,612 B2 | 12/2016 | Hietala et al. | |
| 9,569,386 B2* | 2/2017 | Du | G06F 13/362 |
| 9,639,500 B2* | 5/2017 | Bas | G06F 13/4295 |
| 9,652,451 B2 | 5/2017 | Elder | |
| 9,690,725 B2* | 6/2017 | Sengoku | G06F 13/24 |
| 9,755,821 B2* | 9/2017 | Jang | H04L 7/048 |
| 9,946,677 B2* | 4/2018 | Hapke | G06F 13/4068 |
| 10,185,683 B2 | 1/2019 | Ngo et al. | |
| 2001/0050713 A1 | 12/2001 | Kubo et al. | |
| 2004/0049619 A1 | 3/2004 | Lin | |
| 2004/0100400 A1 | 5/2004 | Perelman et al. | |
| 2004/0128594 A1 | 7/2004 | Elmhurst et al. | |
| 2004/0221067 A1 | 11/2004 | Huang et al. | |
| 2005/0012492 A1 | 1/2005 | Mihalka | |
| 2006/0050694 A1 | 3/2006 | Bury et al. | |
| 2006/0152236 A1 | 7/2006 | Kim | |
| 2006/0236008 A1 | 10/2006 | Asano et al. | |
| 2009/0248932 A1 | 10/2009 | Taylor et al. | |
| 2011/0035632 A1 | 2/2011 | Hong et al. | |
| 2011/0113171 A1 | 5/2011 | Radhakrishnan et al. | |
| 2012/0027104 A1 | 2/2012 | Bas et al. | |
| 2012/0030753 A1 | 2/2012 | Bas et al. | |
| 2012/0226965 A1 | 9/2012 | Hammerschmidt et al. | |
| 2012/0303836 A1 | 11/2012 | Ngo et al. | |
| 2013/0054850 A1 | 2/2013 | Co | |
| 2013/0124763 A1 | 5/2013 | Kessler | |
| 2013/0132624 A1 | 5/2013 | Chen et al. | |
| 2013/0197920 A1 | 8/2013 | Lesso et al. | |
| 2013/0265884 A1 | 10/2013 | Brombal et al. | |
| 2013/0301689 A1 | 11/2013 | Marchand et al. | |
| 2014/0025999 A1 | 1/2014 | Kessler | |
| 2014/0376278 A1 | 12/2014 | Fornage et al. | |
| 2015/0056941 A1 | 2/2015 | Lin et al. | |
| 2015/0074306 A1 | 3/2015 | Ayyagari et al. | |
| 2015/0106541 A1 | 4/2015 | Southcombe et al. | |
| 2015/0127862 A1 | 5/2015 | Fan et al. | |
| 2015/0169482 A1 | 6/2015 | Ngo et al. | |
| 2015/0192974 A1 | 7/2015 | Ngo et al. | |
| 2015/0193297 A1 | 7/2015 | Ngo et al. | |
| 2015/0193298 A1 | 7/2015 | Ngo et al. | |
| 2015/0193321 A1 | 7/2015 | Ngo et al. | |
| 2015/0193373 A1 | 7/2015 | Ngo et al. | |
| 2016/0050513 A1 | 2/2016 | Wang et al. | |
| 2016/0124892 A1 | 5/2016 | Amarilio et al. | |
| 2017/0255250 A1 | 9/2017 | Ngo et al. | |
| 2017/0255578 A1 | 9/2017 | Ngo et al. | |
| 2017/0277651 A1 | 9/2017 | Ngo et al. | |
| 2018/0217959 A1 | 8/2018 | Ngo et al. | |

OTHER PUBLICATIONS

Non-Final Office Action for U.S. Appl. No. 14/659,379, dated Apr. 7, 2017, 37 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Non-Final Office Action for U.S. Appl. No. 14/575,491, dated Nov. 30, 2017, 18 pages.
Non-Final Office Action for U.S. Appl. No. 14/659,292, dated Sep. 29, 2017, 27 pages.
Final Office Action for U.S. Appl. No. 14/659,292, dated Apr. 30, 2018, 24 pages.
Non-Final Office Action for U.S. Appl. No. 14/659,328, dated Sep. 8, 2017, 51 pages.
Final Office Action for U.S. Appl. No. 14/659,328, dated Mar. 20, 2018, 61 pages.
Notice of Allowance for U.S. Appl. No. 14/659,328, dated Jul. 2, 2018, 8 pages.
Non-Final Office Action for U.S. Appl. No. 14/659,355, dated Sep. 20, 2017, 32 pages.
Final Office Action for U.S. Appl. No. 14/659,355, dated Apr. 17, 2018, 11 pages.
Advisory Action for U.S. Appl. No. 14/659,355, dated Jul. 5, 2018, 3 pages.
Non-Final Office Action for U.S. Appl. No. 15/467,790, dated Jun. 28, 2018, 14 pages.
Ex Parte Quayle Action for U.S. Appl. No. 15/365,315, mailed Jul. 26, 2018, 7 pages.
Final Office Action for U.S. Appl. No. 14/659,379, dated Oct. 18, 2017, 44 pages.
Advisory Action for U.S. Appl. No. 14/659,379, dated Feb. 26, 2018, 3 pages.
Notice of Allowance for U.S. Appl. No. 14/659,379, dated Mar. 20, 2018, 10 pages.
Non-Final Office Action for U.S. Appl. No. 14/659,371, dated Sep. 25, 2017, 23 pages.
Final Office Action for U.S. Appl. No. 14/659,371, dated May 3, 2018, 21 pages.
Advisory Action for U.S. Appl. No. 14/659,371, dated Aug. 1, 2018, 3 pages.
Non-Final Office Action for U.S. Appl. No. 14/659,292, dated Dec. 21, 2018, 23 pages.
Final Office Action for U.S. Appl. No. 14/659,292, dated Jun. 4, 2019, 24 pages.
Non-Final Office Action for U.S. Appl. No. 14/659,355, dated Oct. 12, 2018, 8 pages.
Final Office Action for U.S. Appl. No. 14/659,355, dated May 2, 2019, 8 pages.
Non-Final Office Action for U.S. Appl. No. 15/886,209, dated May 17, 2019, 7 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Final Office Action for U.S. Appl. No. 15/365,295, dated Aug. 15, 2019, 11 pages.
Final Office Action for U.S. Appl. No. 15/467,790, dated Nov. 5, 2018, 15 pages.
Advisory Action for U.S. Appl. No. 15/467,790, dated Feb. 26, 2019, 3 pages.
Notice of Allowance for U.S. Appl. No. 15/467,790, dated May 20, 2019, 8 pages.
Non-Final Office Action for U.S. Appl. No. 15/443,236, dated Nov. 16, 2018, 19 pages.
Final Office Action for U.S. Appl. No. 15/443,236, dated May 30, 2019, 20 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Notice of Allowance for U.S. Appl. No. 15/886,209, dated Sep. 11, 2019, 7 pages.
Corrected Notice of Allowance for U.S. Appl. No. 15/467,790, dated Aug. 15, 2019, 6 pages.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.
Notice of Allowance for U.S. Appl. No. 16/402,613, dated Nov. 4, 2019, 9 pages.

(56) References Cited

OTHER PUBLICATIONS

Advisory Action for U.S. Appl. No. 15/365,295, dated Nov. 6, 2019, 3 pages.

* cited by examiner

SINGLE-WIRE BUS (SUBUS) SLAVE CIRCUIT AND RELATED APPARATUS

RELATED APPLICATIONS

This application claims the benefit of U.S. provisional patent application Ser. No. 62/793,336, filed on Jan. 16, 2019, the disclosure of which is incorporated herein by reference in its entirety.

FIELD OF THE DISCLOSURE

The technology of the disclosure relates generally to an apparatus configured to operate based on a single-wire communication bus.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, a radio frequency (RF) signal(s) may be first modulated by a transceiver circuit(s) based on a selected modulation and coding scheme (MCS) and then amplified by a power amplifier(s) prior to being radiated from an antenna(s). In many wireless communication devices, the power amplifier(s) and the antenna(s) are typically located in an RF front-end (RFFE) circuit communicatively coupled to the transceiver circuit(s) via an RFFE bus as defined in the MIPI® alliance specification for radio frequency front-end control interface, version 2.1 (hereinafter referred to as "RFFE specification").

In this regard, FIG. 1 is a schematic diagram of an exemplary RFFE bus structure 10 as defined in the RFFE specification. The RFFE bus structure 10 includes an RFFE master 12 coupled to a number of RFFE slaves 14(1)-14(N) over an RFFE bus 16. According to the RFFE specification, the RFFE bus 16 is a two-wire serial bus that includes a data line 18 and a clock line 20 for communicating a bidirectional data signal SDATA and a clock signal SCLK, respectively.

Notably, not all communications require a two-wire serial bus like the RFFE bus 16. In some case, a single-wire serial bus may be sufficient or even desired for carrying out certain type of communications between circuits. As such, it may be possible to provide a single-wire bus, either concurrent to or independent of, the RFFE bus 16 in a wireless communication device. Further, it may also be desired to make the single-wire bus compatible with the RFFE bus 16.

SUMMARY

Aspects disclosed in the detailed description include a single-wire bus (SuBUS) slave circuit and related apparatus. The SuBUS slave circuit is coupled to a SuBUS bridge circuit via a SuBUS and can be configured to perform a slave task (e.g., impedance measurement and non-volatile memory read) that may block communication on the SuBUS. In this regard, the SuBUS may be required to unblock the SuBUS in time such that the SuBUS bridge circuit can resume communication with the SuBUS slave circuit. Notably, the SuBUS slave circuit may not be equipped with an accurate timing reference source that can determine a precise timing for terminating the slave task and unblock the SuBUS. Instead, the SuBUS slave circuit is configured to terminate the slave task and unblock the SuBUS based on a self-determined slave free-running-oscillator (FRO) count. In examples discussed herein, the SuBUS slave circuit is configured to derive the slave FRO count from a start-of-sequence (SOS) training sequence that precedes any SuBUS telegram of a predefined SuBUS operation (e.g., register-read and register-write), even though the SuBUS operation is totally unrelated to the slave task. As such, it may be possible to eliminate the accurate timing reference source from the SuBUS slave circuit, thus helping to reduce cost and current drain in the SuBUS slave circuit.

In one aspect, a SuBUS slave circuit is provided. The SuBUS slave circuit includes a front-end circuit coupled to a SuBUS. The front-end circuit is configured to receive a SOS training sequence corresponding to a synchronization interval preceding a SuBUS telegram corresponding to a predefined SuBUS operation. The SuBUS slave circuit also includes a digital control circuit coupled to the front-end circuit. The digital control circuit is configured to count a number of FRO pulses during the synchronization interval. The digital control circuit is also configured to determine a slave FRO count during a predefined slave task interval based on the number of FRO pulses counted during the synchronization interval. The digital control circuit is also configured to control the front-end circuit to enable a slave task independent of the predefined SuBUS operation during the predefined slave task interval. The digital control circuit is also configured to control the front-end circuit to disable the slave task in response to the slave FRO count indicating an expiration of the predefined slave task interval.

In another aspect, a SuBUS apparatus is provided. The SuBUS apparatus includes a SuBUS bridge circuit. The SuBUS apparatus also includes a SuBUS coupled to the SuBUS bridge circuit. The SuBUS apparatus also includes a SuBUS slave circuit. The SuBUS slave circuit includes a front-end circuit coupled to the SuBUS. The front-end circuit is configured to receive a SOS training sequence corresponding to a synchronization interval preceding a SuBUS telegram corresponding to a predefined SuBUS operation. The SuBUS slave circuit also includes a digital control circuit coupled to the front-end circuit. The digital control circuit is configured to count a number of FRO pulses during the synchronization interval. The digital control circuit is also configured to determine a slave FRO count during a predefined slave task interval based on the number of FRO pulses counted during the synchronization interval. The digital control circuit is also configured to control the front-end circuit to enable a slave task independent of the predefined SuBUS operation during the predefined slave task interval. The digital control circuit is also configured to control the front-end circuit to disable the slave task in response to the slave FRO count indicating an expiration of the predefined slave task interval.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
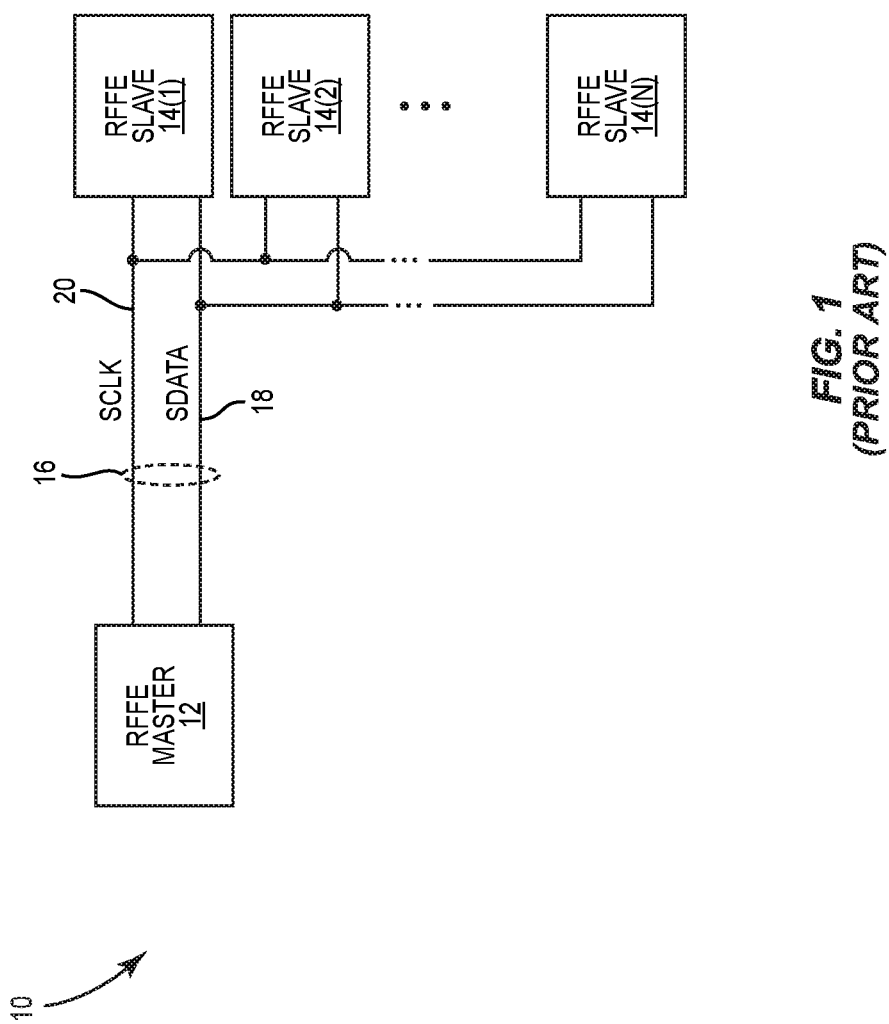
FIG. 1 is a schematic diagram of an exemplary radio frequency front-end (RFFE) bus structure as defined in the MIPI® alliance specification for radio frequency (RF) front-end control interface, version 2.1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a single-wire bus (SuBUS) slave circuit and related apparatus. The SuBUS slave circuit is coupled to a SuBUS bridge circuit via a SuBUS and can be configured to perform a slave task (e.g., impedance measurement and non-volatile memory read) that may block communication on the SuBUS. In this regard, the SuBUS may be required to unblock the SuBUS in time such that the SuBUS bridge circuit can resume communication with the SuBUS slave circuit. Notably, the SuBUS slave circuit may not be equipped with an accurate timing reference source that can determine a precise timing for terminating the slave task and unblock the SuBUS. Instead, the SuBUS slave circuit is configured to terminate the slave task and unblock the SuBUS based on a self-determined slave free-running-oscillator (FRO) count. In examples discussed herein, the SuBUS slave circuit is configured to derive the slave FRO count from a start-of-sequence (SOS) training sequence that precedes any SuBUS telegram of a predefined SuBUS operation (e.g., register-read and register-write), even though the SuBUS operation is totally unrelated to the slave task. As such, it may be possible to eliminate the accurate timing reference source from the SuBUS slave circuit, thus helping to reduce cost and current drain in the SuBUS slave circuit.

Figure 2A:
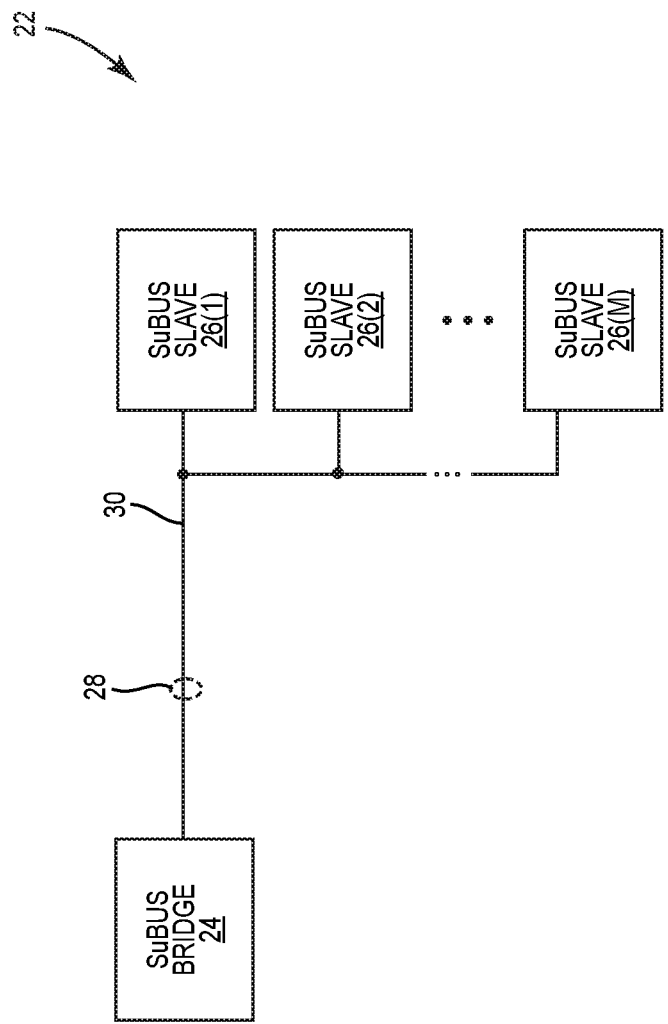
FIG. 2A is a schematic diagram of an exemplary single-wire bus (SuBUS) architecture in which a SuBUS bridge circuit is configured to communicate with a SuBUS slave circuit(s) over a SuBUS having a single wire.
Figure 2B:
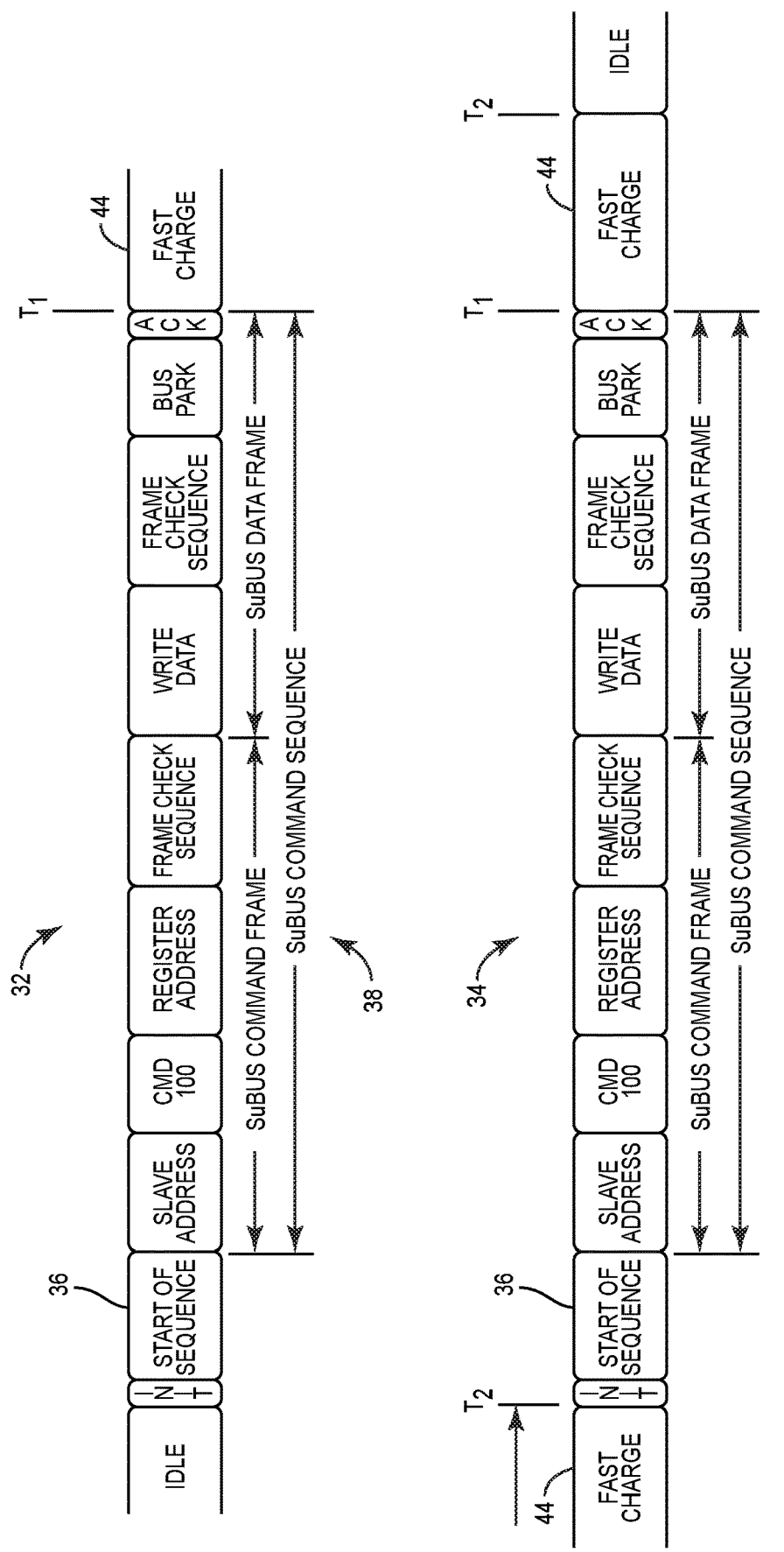
FIG. 2B is a schematic diagram providing an exemplary illustration of one or more SuBUS telegrams communicated over the SuBUS of FIG. 2A.
Figure 2C:
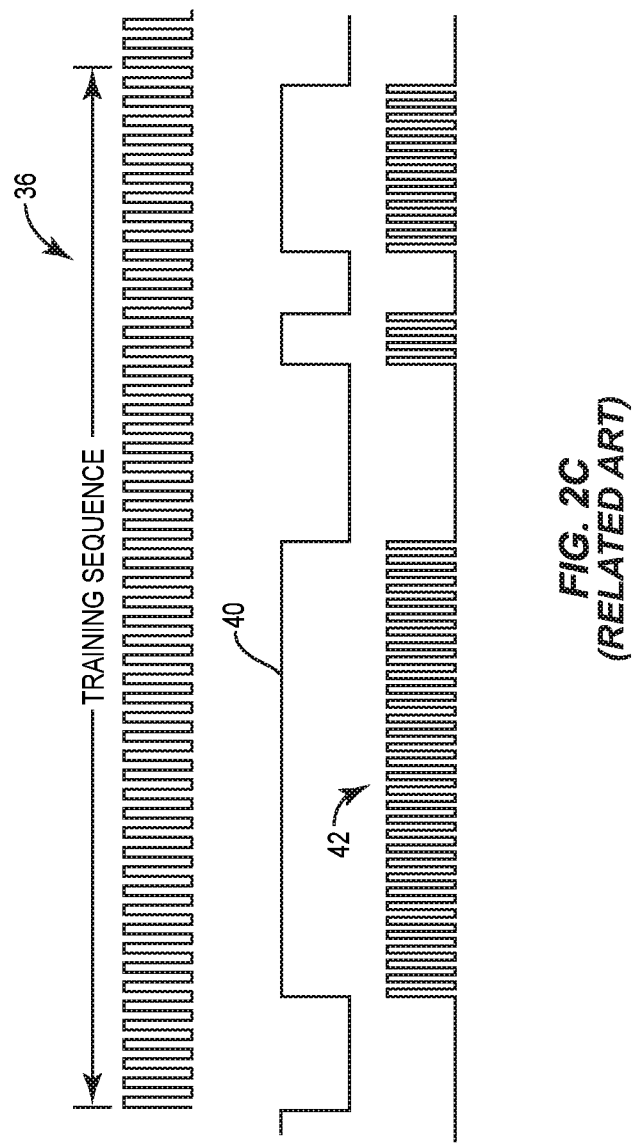
FIG. 2C is a schematic diagram providing an exemplary illustration of a start-of-sequence (SOS) training sequence that appears in each of the SuBUS telegrams of FIG. 2B.

Before discussing the SuBUS slave circuit and the related SuBUS apparatus of the present disclosure, an introduction of a SuBUS structure is first provided with reference to FIGS. 2A-2C to help understand basic operational principles of the SuBUS. The discussion of specific exemplary aspects of a SuBUS slave circuit of the present disclosure starts below with reference to FIG. 3.

In this regard, FIG. 2A is a schematic diagram of an exemplary SuBUS architecture 22 in which a SuBUS bridge circuit 24 is configured to communicate with one or more SuBUS slave circuits 26(1)-26(M) over a SuBUS 28 having a single wire 30. The SuBUS bridge circuit 24 is configured to initiate communications with the SuBUS slave circuits 26(1)-26(M) over the SuBUS 28 by communicating a SuBUS telegram.

FIG. 2B is a schematic diagram providing an exemplary illustration of one or more SuBUS telegrams 32, 34 communicated over the SuBUS 28 of FIG. 2A. Each of the SuBUS telegrams 32, 34 includes a SOS training sequence 36 and a SuBUS command sequence 38. The SuBUS command sequence 38 may correspond to a predefined SuBUS operation (e.g., register-read or register-write) for communicating a data payload(s).

The SOS training sequence 36 always precedes the SuBUS command sequence 38 and is always communicated from the SuBUS bridge circuit 24 to the SuBUS slave circuits 26(1)-26(M) in FIG. 2A. FIG. 2C is a schematic diagram providing an exemplary illustration of the SOS training sequence 36 in each of the SuBUS telegrams 32, 34 in FIG. 2B.

The SOS training sequence 36 is a unique sequence that can never occur with any bit combination in the SuBUS command sequence 38. Each of the SuBUS slave circuits 26(1)-26(M) is configured to always watch for the SOS training sequence 36, which signals a start of the SuBUS telegrams 32, 34. The SOS training sequence 36 corresponds to a synchronization interval 40 configured to set pulse timing (e.g., for read, acknowledgement, and other functions) in each of the SuBUS slave circuits 26(1)-26(M). For example, the synchronization interval 40 can include a number of FRO pulses 42, and each of the SuBUS slave circuits 26(1)-26(M) can be configured to establish a respective timing basis based on the FRO pulses 42. For more detailed information related to the SuBUS architecture 22 of FIGS. 2A-2C, please refer to U.S. Pat. No. 10,185,683 B2, entitled "BUS INTERFACE SYSTEM," U.S. Patent Application Publication Number 2015/0193298 A1, entitled "WRITE TECHNIQUE FOR A BUS INTERFACE SYSTEM," and U.S. Patent Application Publication Number 2015/0193297 A1, entitled "READ TECHNIQUE FOR A BUS INTERFACE SYSTEM," the disclosures of which are incorporated herein by reference in their entireties.

With reference back to FIG. 2B, the SuBUS telegram 34, which succeeds the SuBUS telegram 32, may be separated from the SuBUS telegram 32 by a fast charge period 44 that starts at time $T_1$ and ends at time $T_2$ ($T_2 > T_1$). In this regard, after completing the SuBUS telegram 32 at time $T_1$, the SuBUS bridge circuit 24 will refrain from communicating the SuBUS telegram 34 until time $T_2$. As such, it may be desired to configure one or more of the SuBUS slave circuits 26(1)-26(M) to carry out certain slave-specific tasks.

Figure 3:
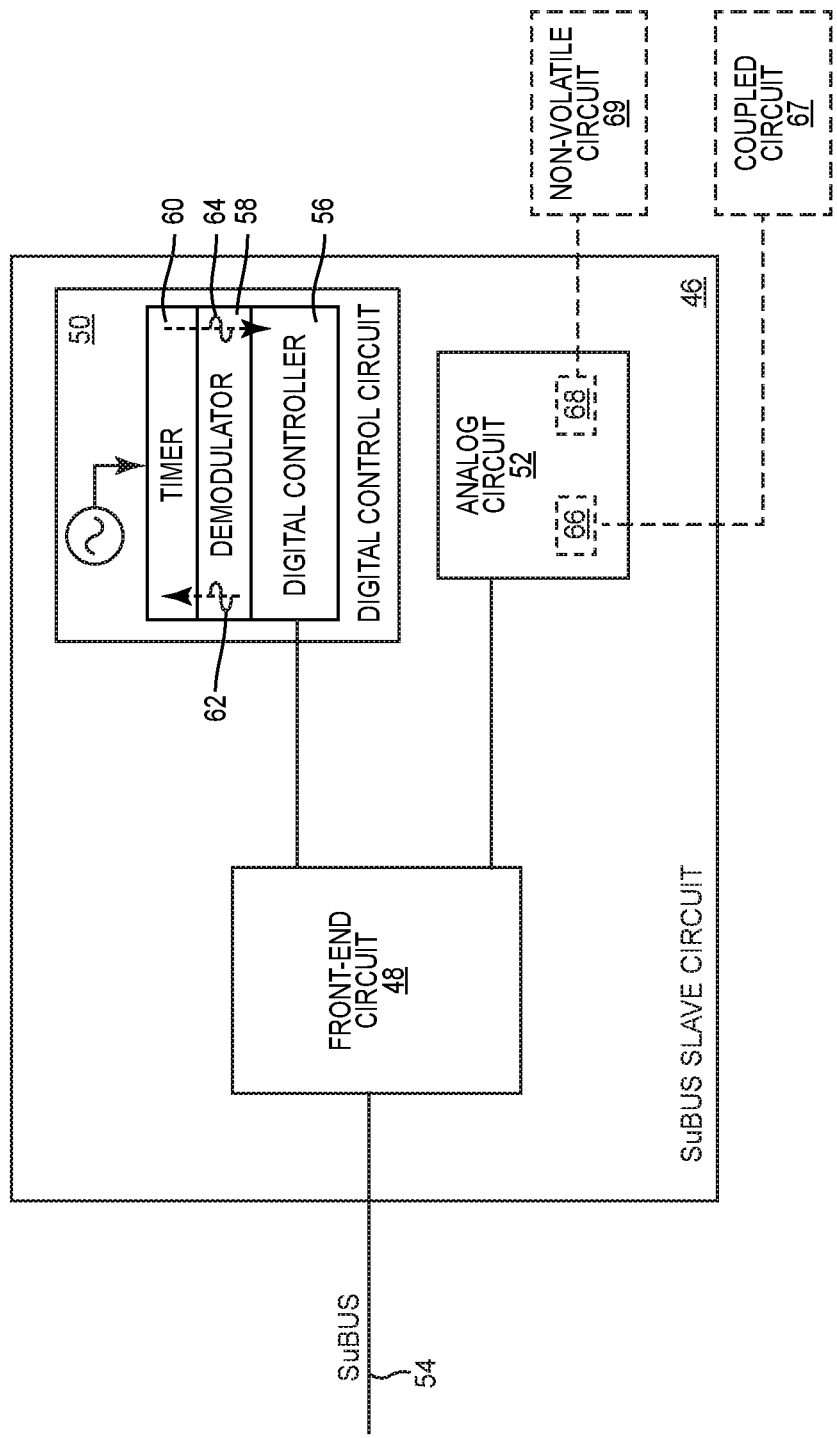
FIG. 3 is a schematic diagram of an exemplary SuBUS slave circuit configured according to an embodiment of the present disclosure.

In this regard, FIG. 3 is a schematic diagram of an exemplary SuBUS slave circuit 46 configured according to an embodiment of the present disclosure. In a non-limiting example, the SuBUS slave circuit 46 can be provided in the SuBUS architecture 22 of FIG. 2A as any of the SuBUS slave circuits 26(1)-26(M). As such, elements in FIGS. 2A-2C are referenced in conjunction with FIG. 3 and will not be re-described herein.

In a non-limiting example, the SuBUS slave circuit 46 can include a front-end circuit 48, a digital control circuit 50, and an analog circuit 52. The front-end circuit 48 is coupled to a SuBUS 54, such as the SuBUS 28 in FIG. 2A. In this regard, the front-end circuit 48 may be configured to receive the SuBUS telegrams 32, 34 in FIG. 2B and, therefore, monitor the SOS training sequence 36 of FIG. 2C in each of the SuBUS telegrams 32, 34. The digital control circuit 50 and the analog circuit 52 may each be coupled to the front-end circuit 48.

The SuBUS slave circuit 46 can be configured to carry out a slave task during the fast charge period 44 in FIG. 2B. As mentioned in FIG. 2B, the SuBUS telegram 32 preceding the fast charge period 44 and the SuBUS telegram 34 succeeding the fast charge period 44 may each correspond to a predefined SuBUS operation (e.g., register-read and register-write). In examples discussed herein, the SuBUS slave circuit 46 can be configured to carry out the slave task during the fast charge period 44 independent of (unrelated to) the predefined SuBUS operation associated with the SuBUS telegrams 32, 34. In one non-limiting example, the SuBUS slave circuit 46 can be configured to perform an impedance measurement operation during the fast charge period 44. In another non-limiting example, the SuBUS slave circuit 46 can be configured to perform a non-volatile memory read operation during the fast charge period 44. It should be appreciated that the SuBUS slave circuit 46 can be configured to perform additional slave tasks that are unrelated to the predefined SuBUS operation associated with the SuBUS telegrams 32, 34.

As discussed in detail below, the front-end circuit 48 may cause the SuBUS 54 to be blocked while the SuBUS slave circuit 46 performs the slave task during the fast charge period 44. In this regard, the SuBUS slave circuit 46 needs to unblock the SuBUS 54 prior to time $T_2$ such that the SuBUS bridge circuit 24 can communicate the SuBUS telegram 34. Notably, the SuBUS slave circuit 46 may not be equipped with a crystal oscillator or even a calibrated oscillator due to cost and/or current drain considerations (e.g., achieving lower cost and/or lower current drain). As such, the SuBUS slave circuit 46 may not be able to establish an accurate timing reference relative to a higher accuracy timing reference in the SuBUS bridge circuit 24. In this regard, even though the SuBUS slave circuit 46 may be aware of the duration of the fast charge period 44, the SuBUS slave circuit 46 may have difficulty in unblocking the SuBUS 54 prior to time $T_2$. Further, since the SuBUS 54 is blocked by the front-end circuit 48, it may not be possible for the SuBUS bridge circuit 24 to provide an explicit trigger to the SuBUS slave circuit 46 to unblock the SuBUS 54. As such, it may be necessary for the SuBUS slave circuit 46 to determine time $T_2$ within acceptable accuracy (e.g., based on the FRO pulses 42 in the SOS training sequence 36). For example, the SuBUS slave circuit 46 can establish a local timing reference based on the SOS training sequence 36 in the SuBUS telegram 32, even though the SuBUS operation associated with the SuBUS telegram 32 is completely unrelated to the specific slave task being performed by the SuBUS slave circuit 46 during the fast charge period 44.

In this regard, the digital control circuit 50 can be configured to count the FRO pulses 42 during the synchronization interval 40 in the SOS training sequence 36 of FIG. 2C to determine a FRO pulse count ($C_{FRO}$). Subsequently, the digital control circuit 50 can determine a slave FRO count ($C_{FRO-S}$) during a predefined slave task interval (e.g., the fast charge period 44) based on the FRO pulse count ($C_{FRO}$). Accordingly, the digital control circuit 50 may use the slave FRO count ($C_{FRO-S}$) to help determine the time (e.g., time $T_2$) for unblocking the SuBUS 54. The digital control circuit 50 may be configured to determine the slave FRO count ($C_{FRO-S}$) based on the equation (Eq. 1) below.

$$C_{FRO-S} = \frac{C_{FRO} * (\text{Predefined Slave Task Interval})}{\text{Synchronisation Interval}} \quad \text{(Eq. 1)}$$

In a non-limiting example, the SuBUS bridge circuit 24 has a reference clock frequency at 56.7 megahertz (MHz) and operates with an oversample ratio (OSV) of sixteen (16).

Accordingly, the synchronization interval 40 equals approximately 555.55 (=2*16/56.7) nanoseconds (ns). If the SuBUS bridge circuit 24 generates the FRO pulses 42 at 78 MHz, then there may be 43 (=FLOOR (555.55 ns*78 MHz)) FRO pulses 42 during the synchronization interval 40. As such, if the predefined slave task interval is 100 milliseconds (ms), for example, then the slave FRO count ($C_{FRO-S}$) can be determined as 7,740,008 based on the equation (Eq. 1).

In a non-limiting example, the digital control circuit 50 includes a digital controller 56, a demodulator 58, and a timer 60. The digital controller 56 may control the front-end circuit 48 to block the SuBUS 54 at time $T_1$ such that the SuBUS slave circuit 46 can start performing the slave task. The demodulator 58 may be configured to determine the FRO count ($C_{FRO}$) based on the SOS training sequence 36 in the SuBUS telegram 32, for example. Accordingly, the demodulator 58 may derive the slave FRO count ($C_{FRO-S}$) based on the equation (Eq. 1).

The timer 60 may be configured to determine the time (e.g., time $T_2$) for unblocking the SuBUS 54 based on the slave FRO count ($C_{FRO-S}$). In a non-limiting example, the demodulator 58 can be configured to initialize the timer 60 via an initialization signal 62. The timer 60 can be configured to determine an expiration of the predefined slave task interval based on the slave FRO count ($C_{FRO-S}$) and provides an indication signal 64 to the digital controller 56 to indicate the expiration of the predefined slave task interval.

In one example, the timer 60 can initialized to zero (0) and count up afterwards. In this regard, the timer 60 may provide the indication signal 64 indicating the expiration of the predefined slave task interval when the timer 60 equals the slave FRO count ($C_{FRO-S}$). In another example, the timer 60 can initialized to the slave FRO count ($C_{FRO-S}$) and count down afterwards. In this regard, the timer 60 may provide the indication signal 64 indicating the expiration of the predefined slave task interval when the timer 60 equals 0.

In response to receiving the indication signal 64 indicating the expiration of the predefined slave task interval, the digital controller 56 may control the front-end circuit 48 to unblock the SuBUS 54. Accordingly, the SuBUS bridge circuit 24 can communicate subsequent SuBUS telegrams, such as the SuBUS telegram 34 in FIG. 2B.

During the predefined slave task interval, the SuBUS slave circuit 46 may be configured to perform an impedance measurement operation. In this regard, the analog circuit 52 may include an impedance sensor 66 configured to perform impedance measurement of a coupled circuit 67 (e.g., an antenna circuit). During the predefined slave task interval, the SuBUS slave circuit 46 may also be configured to perform a non-volatile memory read operation. In this regard, the analog circuit 52 may include a memory controller 68 configured to read from a non-volatile memory 69 that may be located in the SuBUS slave circuit 46, the analog circuit 52, the digital control circuit 50, and/or any other circuit coupled to the memory controller 68.

Notably, the impedance sensor 66 and/or the memory controller 68 may require a higher charging current (e.g., up to 100 mA) during the predefined slave task interval (e.g., 100 ms) to perform the impedance measurement task and/or the non-volatile memory read task. However, the SuBUS slave circuit 46 may not be capable of supplying the higher charging current for the predefined slave task interval. As such, it may be necessary for the SuBUS slave circuit 46 to draw the higher charging current from a SuBUS bridge circuit via the SuBUS 54.

Figure 4:
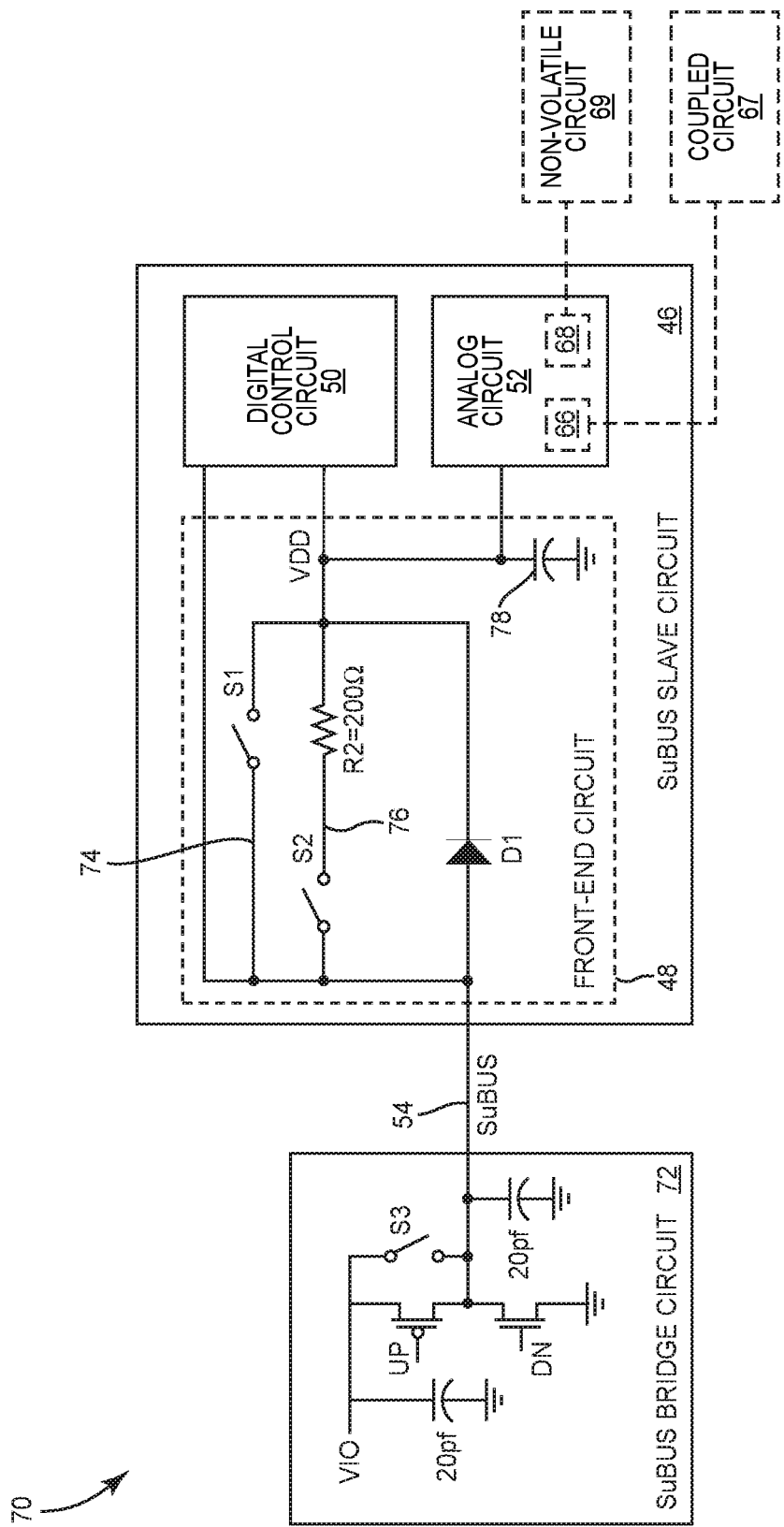
FIG. 4 is a schematic diagram of an exemplary SuBUS apparatus incorporating the SuBUS slave circuit of FIG. 3.

In this regard, FIG. 4 is a schematic diagram of an exemplary SuBUS apparatus 70 including the SuBUS slave circuit 46 of FIG. 3 and a SuBUS bridge circuit 72 coupled to the SuBUS slave circuit 46 via the SuBUS 54. Common elements between FIGS. 3 and 4 are shown therein with common element numbers and will not be re-described herein.

The front-end circuit 48 may include a fast charging path 74 and a low current path 76. The fast charging path 74 includes a first switch S1, and the low current path 76 includes a second switch S2. The SuBUS bridge circuit 72 may include a third switch S3 coupled to a first voltage VIO. In a non-limiting example, the SuBUS bridge circuit 72 can be configured to close the third switch S3 during the fast charge period 44 in FIG. 2B to charge the SuBUS slave circuit 46 and open the third switch S3 when the fast charge period 44 is over. In other words, the SuBUS bridge circuit 72 can be configured to automatically close the third switch S3 at time $T_1$ and open the third switch S3 at time $T_2$.

The digital control circuit 50 may control the front-end circuit 48 to close the first switch S1 concurrent to opening the second switch S2 at a start of the predefined slave task interval (e.g., time $T_1$) such that the SuBUS slave circuit 46 can draw the higher charging current from the SuBUS bridge circuit 72 via the SuBUS 54. As such, the SuBUS slave circuit 46 creates a second voltage VDD close to the first voltage VIO. The second voltage VDD may charge a holding capacitor 78, thus providing the higher charging current to enable the analog circuit 52 to carry out the slave task during the predefined slave task interval.

In contrast, the digital control circuit 50 may control the front-end circuit 48 to open the first switch S1 concurrent to closing the second switch S2 in response to the slave FRO count ($C_{FRO-S}$) indicating an expiration of the predefined slave task interval (e.g., at or prior to time $T_2$). Accordingly, the SuBUS slave circuit 46 may draw a lower charging current, which is lower than the higher charging current, via the low current path 76.

Those skilled in the art will recognize improvements and modifications to the embodiments of the present disclosure. All such improvements and modifications are considered within the scope of the concepts disclosed herein and the claims that follow.

What is claimed is:

1. A single-wire bus (SuBUS) slave circuit comprising:
 a front-end circuit coupled to a SuBUS and configured to receive a start-of-sequence (SOS) training sequence corresponding to a synchronization interval and preceding a SuBUS telegram corresponding to a predefined SuBUS operation; and
 a digital control circuit coupled to the front-end circuit and configured to:
  count a plurality of free-running oscillator (FRO) pulses during the synchronization interval;
  determine a slave FRO count during a predefined slave task interval based on the plurality of FRO pulses counted during the synchronization interval;
  control the front-end circuit to enable a slave task independent of the predefined SuBUS operation during the predefined slave task interval; and
  control the front-end circuit to disable the slave task in response to the slave FRO count indicating an expiration of the predefined slave task interval.

2. The SuBUS slave circuit of claim 1 wherein the digital control circuit is further configured to:
 control the front-end circuit to enable an impedance measurement operation during the predefined slave task interval; and control the front-end circuit to disable the impedance measurement operation in response to the slave FRO count indicating the expiration of the predefined slave task interval.

3. The SuBUS slave circuit of claim 1 wherein the digital control circuit is further configured to:
control the front-end circuit to enable a non-volatile memory read operation during the predefined slave task interval; and
control the front-end circuit to disable the non-volatile memory read operation in response to the slave FRO count indicating the expiration of the predefined slave task interval.

4. The SuBUS slave circuit of claim 1 wherein the digital control circuit comprises:
a digital controller configured to:
control the front-end circuit to enable the slave task during the predefined slave task interval; and
control the front-end circuit to disable the slave task in response to receiving an indication signal; and
a timer configured to provide the indication signal to the digital controller in response to the slave FRO count indicating the expiration of the predefined slave task interval.

5. The SuBUS slave circuit of claim 4 wherein the digital control circuit further comprises a demodulator configured to:
count the plurality of FRO pulses during the synchronization interval; and
derive the slave FRO count during the predefined slave task interval based on the count of the plurality of FRO pulses during the synchronization interval.

6. The SuBUS slave circuit of claim 1 further comprising an analog circuit configured to perform the slave task during the predefined slave task interval.

7. The SuBUS slave circuit of claim 6 wherein:
the analog circuit comprises an impedance sensor configured to perform an impedance measurement operation during the predefined slave task interval; and
the digital control circuit is further configured to:
control the front-end circuit to enable the impedance sensor to perform the impedance measurement operation during the predefined slave task interval; and
control the front-end circuit to disable the impedance measurement operation in response to the slave FRO count indicating the expiration of the predefined slave task interval.

8. The SuBUS slave circuit of claim 6 wherein:
the analog circuit comprises a memory controller configured to perform a non-volatile memory read operation during the predefined slave task interval; and
the digital control circuit is further configured to:
control the front-end circuit to enable the memory controller to perform the non-volatile memory read operation during the predefined slave task interval; and
control the front-end circuit to disable the non-volatile memory read operation in response to the slave FRO count indicating the expiration of the predefined slave task interval.

9. The SuBUS slave circuit of claim 6 wherein the digital control circuit is further configured to control the front-end circuit to provide a higher charging current to the analog circuit for performing the slave task during the predefined slave task interval.

10. The SuBUS slave circuit of claim 9 wherein the front-end circuit comprises:
a fast charging path comprising a first switch, the fast charging path configured to draw the higher charging current via the SuBUS and provide the higher charging current to the analog circuit for performing the slave task during the predefined slave task interval; and
a low current path comprising a second switch and configured to draw a lower charging current via the SuBUS outside the predefined slave task interval.

11. The SuBUS slave circuit of claim 10 wherein the digital control circuit is further configured to:
close the first switch and open the second switch to provide the higher charging current from the SuBUS to the analog circuit for performing the slave task during the predefined slave task interval; and
open the first switch and close the second switch in response to the slave FRO count indicating the expiration of the predefined slave task interval.

12. A single-wire bus (SuBUS) apparatus comprising:
a SuBUS bridge circuit;
a SuBUS coupled to the SuBUS bridge circuit; and
a SuBUS slave circuit comprising:
a front-end circuit coupled to the SuBUS and configured to receive a start-of-sequence (SOS) training sequence corresponding to a synchronization interval and preceding a SuBUS telegram corresponding to a predefined SuBUS operation; and
a digital control circuit coupled to the front-end circuit and configured to:
count a plurality of free-running oscillator (FRO) pulses during the synchronization interval;
determine a slave FRO count during a predefined slave task interval based on the plurality of FRO pulses counted during the synchronization interval;
control the front-end circuit to enable a slave task independent of the predefined SuBUS operation during the predefined slave task interval; and
control the front-end circuit to disable the slave task in response to the slave FRO count indicating an expiration of the predefined slave task interval.

13. The SuBUS apparatus of claim 12 wherein the digital control circuit is further configured to:
control the front-end circuit to enable an impedance measurement operation during the predefined slave task interval; and
control the front-end circuit to disable the impedance measurement operation in response to the slave FRO count indicating the expiration of the predefined slave task interval.

14. The SuBUS apparatus of claim 12 wherein the digital control circuit is further configured to:
control the front-end circuit to enable a non-volatile memory read operation during the predefined slave task interval; and
control the front-end circuit to disable the non-volatile memory read operation in response to the slave FRO count indicating the expiration of the predefined slave task interval.

15. The SuBUS apparatus of claim 12 wherein the digital control circuit comprises:
a digital controller configured to:
control the front-end circuit to enable the slave task during the predefined slave task interval; and
control the front-end circuit to disable the slave task in response to receiving an indication signal; and a timer configured to provide the indication signal to the digital controller in response to the slave FRO count indicating the expiration of the predefined slave task interval.

16. The SuBUS apparatus of claim 15 wherein the digital control circuit further comprises a demodulator configured to:
count the plurality of FRO pulses during the synchronization interval; and
derive the slave FRO count during the predefined slave task interval based on the count of the plurality of FRO pulses during the synchronization interval.

17. The SuBUS apparatus of claim 12 wherein the SuBUS slave circuit further comprises an analog circuit configured to perform the slave task during the predefined slave task interval.

18. The SuBUS apparatus of claim 17 wherein:
the analog circuit comprises an impedance sensor configured to perform an impedance measurement operation during the predefined slave task interval; and
the digital control circuit is further configured to:
control the front-end circuit to enable the impedance sensor to perform the impedance measurement operation during the predefined slave task interval; and
control the front-end circuit to disable the impedance measurement operation in response to the slave FRO count indicating the expiration of the predefined slave task interval.

19. The SuBUS apparatus of claim 17 wherein:
the analog circuit comprises a memory controller configured to perform a non-volatile memory read operation during the predefined slave task interval; and
the digital control circuit is further configured to:
control the front-end circuit to enable the memory controller to perform the non-volatile memory read operation during the predefined slave task interval; and
control the front-end circuit to disable the non-volatile memory read operation in response to the slave FRO count indicating the expiration of the predefined slave task interval.

20. The SuBUS apparatus of claim 17 wherein the digital control circuit is further configured to control the front-end circuit to provide a higher charging current to the analog circuit for performing the slave task during the predefined slave task interval.

21. The SuBUS apparatus of claim 20 wherein the front-end circuit comprises:
a fast charging path comprising a first switch, the fast charging path configured to draw the higher charging current from the SuBUS bridge circuit via the SuBUS and provide the higher charging current to the analog circuit for performing the slave task during the predefined slave task interval; and
a low current path comprising a second switch and configured to draw a lower charging current via the SuBUS outside the predefined slave task interval.

22. The SuBUS apparatus of claim 21 wherein the digital control circuit is further configured to:
close the first switch and open the second switch to provide the higher charging current from the SuBUS to the analog circuit for performing the slave task during the predefined slave task interval; and
open the first switch and close the second switch in response to the slave FRO count indicating the expiration of the predefined slave task interval.

* * * * *